(12) United States Patent
Weihua et al.

(10) Patent No.: US 12,607,540 B2
(45) Date of Patent: Apr. 21, 2026

(54) OPTICAL BACK REFLECTION DIAGNOSTICS FOR MICRO OPTICAL COMPONENTS

(71) Applicant: JABIL INC., St. Petersburg, FL (US)

(72) Inventors: Guan Weihua, St. Petersburg, FL (US); William Sterling, St. Petersburg, FL (US); Chao Su, St. Petersburg, FL (US)

(73) Assignee: JABIL INC.

( * ) Notice: Subject to any disclaimer, the term of this patent is extended or adjusted under 35 U.S.C. 154(b) by 222 days.

(21) Appl. No.: 17/919,215

(22) PCT Filed: Apr. 13, 2021

(86) PCT No.: PCT/US2021/027116
§ 371 (c)(1),
(2) Date: Oct. 14, 2022

(87) PCT Pub. No.: WO2021/211606
PCT Pub. Date: Oct. 21, 2021

(65) Prior Publication Data
US 2023/0160779 A1 May 25, 2023

Related U.S. Application Data

(60) Provisional application No. 63/009,865, filed on Apr. 14, 2020.

(51) Int. Cl.
| | |
|---|---|
| *G01M 11/00* | (2006.01) |
| *H04B 10/071* | (2013.01) |
| *H04B 10/073* | (2013.01) |

(52) U.S. Cl.
CPC ........... *G01M 11/31* (2013.01); *H04B 10/071* (2013.01); *H04B 10/0731* (2013.01)

(58) Field of Classification Search
CPC .. G01M 11/00; G01M 11/02; G01M 11/0207; G01M 11/30; G01M 11/31;
(Continued)

(56) References Cited

U.S. PATENT DOCUMENTS

| | | | | |
|---|---|---|---|---|
| 4,741,616 A | * | 5/1988 | So | G01M 11/31 356/73.1 |
| 4,883,954 A | * | 11/1989 | Esser | G01M 11/3145 250/227.12 |

(Continued)

FOREIGN PATENT DOCUMENTS

| | | | | |
|---|---|---|---|---|
| EP | 0905490 A1 | 3/1999 | | |
| GB | 2252154 A | * | 7/1992 | .......... G01M 11/319 |

(Continued)

OTHER PUBLICATIONS

Sato, Yoshiaki et al., "Optical Time Domain Reflectometry in Optical Transmission Lines Containing In-Line Er-Doped Fiber Amplifiers," Journal of Lightwave Technology, vol. 10, No. 1, pp. 78-83. (Year: 1992).*

(Continued)

*Primary Examiner* — Gordon J Stock, Jr.
(74) *Attorney, Agent, or Firm* — Riverside Law LLP

(57) ABSTRACT

An apparatus, system and method for testing a micro-optical component system. The apparatus, system and method may include a receiver for receiving the micro optical component system; a light source; and a coupler for passing aspects of light from the light source through the micro optical component system to a termination, and for passing remaining aspects from the light source back reflected from the micro optical component system to a power meter. A reading at the power meter of the back reflection may correspond to a diagnosis of the micro optical component system.

14 Claims, 5 Drawing Sheets

(58) Field of Classification Search

CPC .......... G01M 11/3109; G01M 11/3118; G01M 11/3127; G01M 11/3136; G01M 11/3145; G01M 11/3154; G01M 11/3163; G01M 11/3172; G01M 11/319; H04B 10/071; H04B 10/073; H04B 10/0731

See application file for complete search history.

(56) References Cited

U.S. PATENT DOCUMENTS

| | | | | |
|---|---|---|---|---|
| 5,056,915 | A * | 10/1991 | Curtis | G01M 11/3172 356/73.1 |
| 5,062,704 | A * | 11/1991 | Bateman | G01M 11/3145 356/73.1 |
| 5,090,802 | A * | 2/1992 | Longhurst | G01M 11/3154 356/73.1 |
| 5,214,728 | A * | 5/1993 | Shigematsu | H04B 10/038 385/24 |
| 5,245,401 | A * | 9/1993 | Tache | G01M 11/3109 356/73.1 |
| 5,442,434 | A * | 8/1995 | Liao | G01M 11/3145 356/73.1 |
| 5,448,059 | A * | 9/1995 | Blank | G01M 11/319 356/73.1 |
| 5,485,264 | A * | 1/1996 | Chu | G01M 11/3145 356/73.1 |
| 5,625,450 | A * | 4/1997 | Ikeno | G01M 11/31 356/73.1 |
| 5,870,183 | A * | 2/1999 | Povlsen | G01M 11/3145 356/73.1 |
| 6,067,150 | A * | 5/2000 | Beller | G01M 11/3109 356/73.1 |
| 6,388,741 | B1 * | 5/2002 | Beller | G01M 11/3127 356/73.1 |
| 6,459,478 | B1 * | 10/2002 | Schmidt | G01M 11/31 356/73.1 |
| 6,515,750 | B1 | 2/2003 | Malyak et al. | |
| 6,590,642 | B2 * | 7/2003 | Iida | G01M 11/3154 356/73.1 |
| 6,930,768 | B2 * | 8/2005 | Ingles, Jr. | G01M 11/083 356/73.1 |
| 7,011,453 | B1 * | 3/2006 | Harres | G01M 11/3109 356/73.1 |
| 7,224,174 | B1 | 5/2007 | Malendevich et al. | |
| 7,411,666 | B2 * | 8/2008 | Beller | G01M 11/3109 356/73.1 |
| 7,440,695 | B2 * | 10/2008 | Lee | H04B 10/071 398/28 |
| 7,595,865 | B2 * | 9/2009 | Hartog | H04B 10/071 356/73.1 |
| 7,605,912 | B1 * | 10/2009 | Asher | G01M 11/3145 356/73.1 |
| 8,000,601 | B2 * | 8/2011 | Schofield | H04B 10/85 398/40 |
| 8,213,002 | B2 * | 7/2012 | Kassler | G01M 11/3145 356/73.1 |
| 9,194,763 | B2 * | 11/2015 | Hu | H04B 10/071 |
| 9,197,319 | B2 * | 11/2015 | Lee | H04B 10/071 |
| 9,419,708 | B2 * | 8/2016 | Rad | G01M 11/319 |
| 9,503,181 | B2 * | 11/2016 | McClean | G01M 11/3154 |
| 9,825,700 | B2 * | 11/2017 | Ruchet | H04B 10/07955 |
| 2002/0101577 | A1 * | 8/2002 | Thwing | G01M 11/33 356/73.1 |
| 2008/0144015 | A1 * | 6/2008 | Goto | G01M 11/31 356/73.1 |
| 2011/0153544 | A1 * | 6/2011 | Nagel | H04B 10/071 706/54 |
| 2012/0176607 | A1 | 7/2012 | Ott | |
| 2014/0226970 | A1 * | 8/2014 | Urban | G01M 11/3127 398/21 |
| 2015/0062562 | A1 | 3/2015 | Kassler | |

FOREIGN PATENT DOCUMENTS

| | | | | | |
|---|---|---|---|---|---|
| JP | H07162366 | A | * | 6/1995 | |
| JP | 2718234 | B2 | * | 2/1998 | |
| JP | 2001083040 | A | * | 3/2001 | |
| JP | 2009103669 | A | * | 5/2009 | |
| JP | 2012088268 | A | * | 5/2012 | |
| KR | 20090046096 | A | * | 5/2009 | |
| KR | 20140051495 | A | * | 5/2014 | |
| WO | WO-2020169964 | A1 | * | 8/2020 | G01M 11/31 |

OTHER PUBLICATIONS

International Search Report for PCT/U2021/027116, dated Aug. 4, 2021.

Written Opinion of the International Searching Authority for PCT/U2021/027116, dated Aug. 4, 2021.

* cited by examiner

Optical back reflection of 2% coupler

Optical back reflection of GFF

700

Input 1 ──── 702a ── 704 ── 710 ── 702b ── 706 ──→ Output 1
Isolator 1   WDM   EDF   Isolator 2   Tap Uncooled dual PUMP

PD

Optical back reflection pf EDFA (pump off)

Optical back reflection of EDFA (pump on)

FIG.9

OPTICAL BACK REFLECTION DIAGNOSTICS FOR MICRO OPTICAL COMPONENTS

CROSS-REFERENCE TO RELATED APPLICATIONS

The present application claims benefit of priority to International Application No. PCT/US2021/027116, filed Apr. 13, 2021, entitled: "Optical Back Reflection Diagnostics for Micro Optical Components", which is based on U.S. Provisional Application No. 63/009,865, filed Apr. 14, 2020, entitled: "Optical Back Reflection Diagnostics for Micro Optical Components," the entirety of which is incorporated herein by reference as if set forth in its entirety.

BACKGROUND

Field of the Disclosure

The present disclosure relates to optical components, and, more specifically, to an apparatus, system and method for optical back reflection diagnostics for micro optical components.

Description of the Background

Photonic devices are devices for creating, manipulating or detecting light. Such devices include laser diodes, light-emitting diodes, solar and photovoltaic cells, displays and optical amplifiers, by way of non-limiting example.

As photonic devices scale down to the micrometer size range, diagnostics related to such devices becomes increasingly challenging. At present, frequent methods used for diagnosing photonics devices include image forming or interferometry. However, these methods can prove costly, and typically require substantial equipment and this testing area.

Thus, the need exists for an improved apparatus, system and method for testing and diagnostics of micro-optical components.

SUMMARY

The disclosure is and includes an apparatus, system and method for testing a micro-optical component system. The apparatus, system and method may include a receiver for receiving the micro optical component system; a light source; and a coupler for passing aspects of light from the light source through the micro optical component system to a termination, and for passing remaining aspects from the light source back reflected from the micro optical component system to a power meter. A reading at the power meter of the back reflection may correspond to a diagnosis of the micro optical component system.

The apparatus, system and method may also include providing diagnostics for a micro-optical component system, using: a receiver for receiving the micro optical component system; a reflectometer for passing aspects of light from the light source through the micro optical component system, and for receiving the remaining aspects from the light source upon back reflection from at least one interface of the micro optical component system; and a comparative database associated with the reflectometer, wherein a reading at the reflectometer of the back reflection corresponds to the diagnostic of the micro optical component system in the comparative database.

Thus, the disclosed embodiments provide an improved apparatus, system and method for testing and diagnostics of micro-optical components.

BRIEF DESCRIPTION OF THE DRAWINGS

The disclosed non-limiting embodiments are discussed in relation to the drawings appended hereto and forming part hereof, wherein like numerals indicate like elements, and in which:

FIG. 9 illustrates aspects of the embodiments.

DETAILED DESCRIPTION

Figure 1:
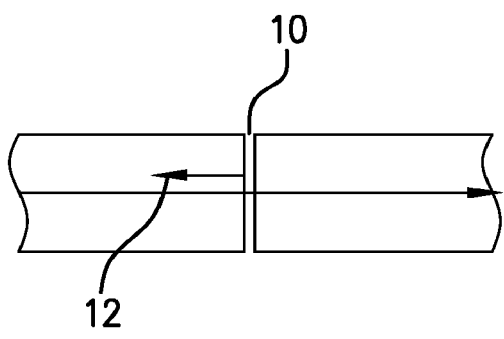
FIG. 1 illustrates aspects of the embodiments.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the exemplary embodiments.

Processor-implemented modules and print systems are disclosed herein that may provide access to and transformation of a plurality of types of digital content, including but not limited to back reflection data streams, and the algorithms applied may track, deliver, manipulate, compare, transform, transceive and report the accessed content. Described embodiments of these modules, apps, systems and methods are intended to be exemplary and not limiting.

Reflectance, which is referred to as "optical back reflection" or "optical return loss", of a connection is the amount of light that is reflected back up the fiber toward the source. These light reflections may occur off the interface of the polished end surface of the mated connectors and air. That is, optical back reflection is caused by the light going through the change in index of refraction at an interface between a fiber and another element or transfer medium.

This interface 10, at which the optical back reflection 12 may be measured, is illustrated in FIG. 1, and may be measured as a loss in signal (in dB). Moreover, as used herein, optical back reflection 12 may include individual back reflections, and the total of all reflectance events and total fiber system backscatter over the entire length of a fiber system under test. The skilled artisan will appreciate that there are various methodologies whereby back loss may be measured, such as at system entry and exit, element-by-element, or periodically in-line.

Figure 2:
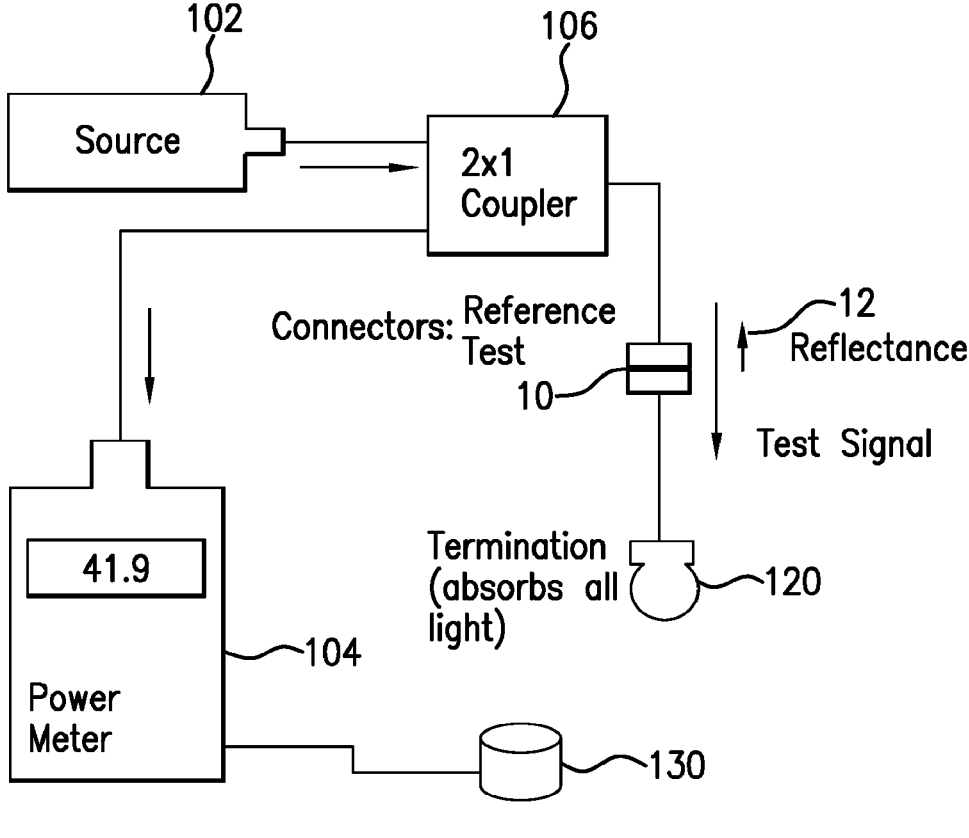
FIG. 2 illustrates aspects of the embodiments.

As referenced, a variety of setups for testing back reflectance/return losses of connectors or devices may use a light source 102 and power meter 104. This is illustrated in FIG. 2.

More particularly, a light source 102 may be provided through a coupler 106 to the connection 10 under test. The light reflected 12 from the connection 10 may be split by the coupler 106 and is measured by the power meter 104.

In order to calculate the back reflectance/return loss 12, the magnitude of the test signal and the split ratio of the coupler 106, including the excess loss of the coupler, should be known. Further, the reflectance 12 from the rest of the system under test should also be reduced or eliminated, such as by an absorbing termination 120. A termination may comprise a device, or the insertion of the end of the connector into an index matching gel or liquid, by way of example.

Of course, in order to provide such diagnosis, the power meter 104 may be associated with a comparative element, such as a database 130. Such a comparative database may be relational, and may include, for example, for each of various indicated micro optical component systems under test, what certain readings on the power meter correspond to as diagnostic elements, by way of example.

Figures 3, 4:
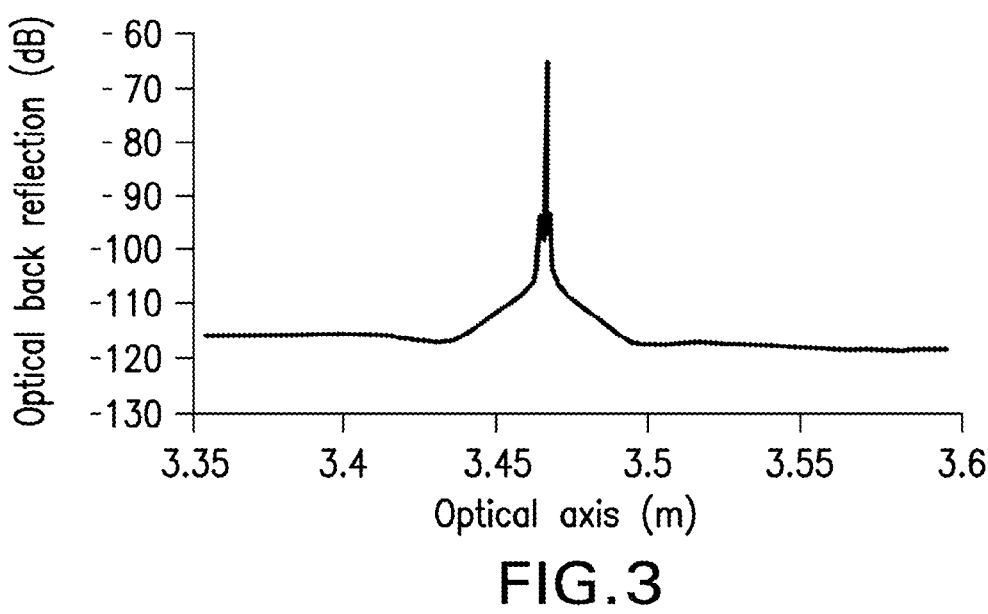
FIG. 3 illustrates aspects of the embodiments.
FIG. 4 illustrates aspects of the embodiments.
Figure 5:
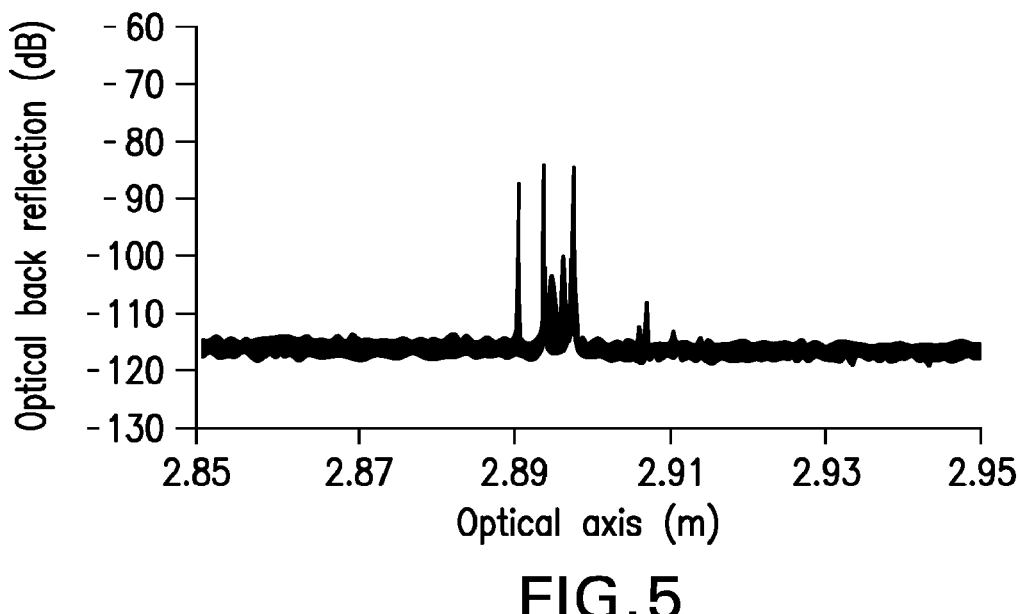
FIG. 5 illustrates aspects of the embodiments.
Figure 6:
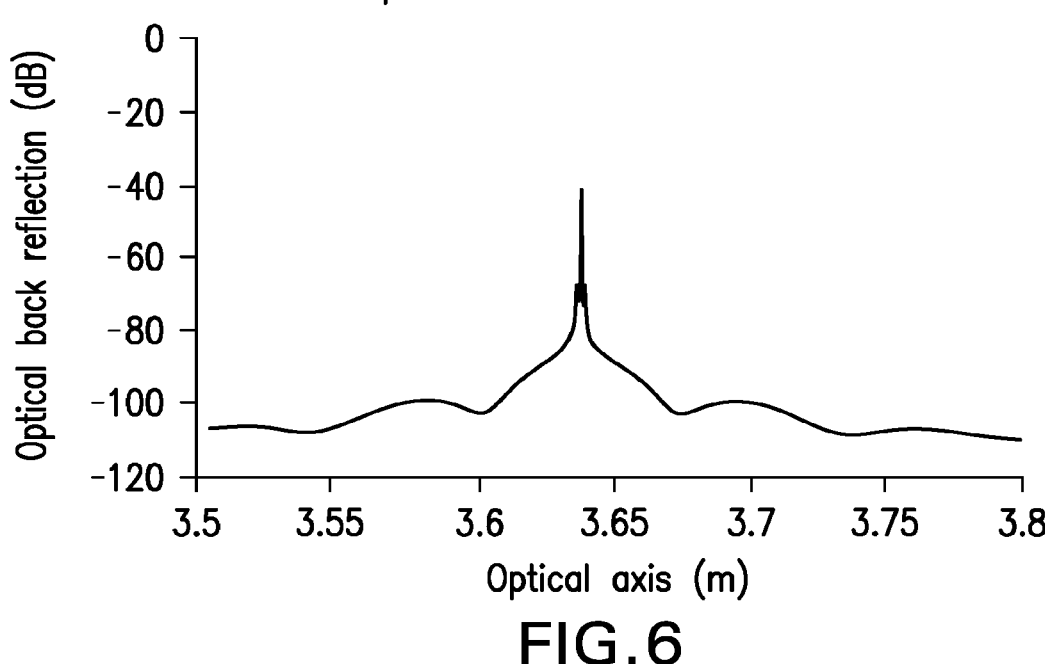
FIG. 6 illustrates aspects of the embodiments.

In the embodiments, optical back reflections of individual micro optical components may be measured using any of the methods discussed herein, including an optical back reflectometer. FIG. 3 graphically illustrates the back reflection of a 2% optical coupler. FIG. 4 graphically shows the back reflection of a gain flattening filter (GFF). FIG. 5 graphically illustrates the back reflection of an optical fiber isolator. FIG. 6 graphically shows the back reflection of a 980/1550 nm wavelength division multiplexer (WDM). As is evident from FIGS. 3-6, different types of micro optical components provide different kinds of back reflection patterns. Thereby, back reflection patterns may be used for the diagnostics of micro optical devices.

Accordingly, the embodiments enable the use of optical back reflection to diagnose micro optical components, including optical amplifiers, such as an Erbium-doped fiber amplifier (EDFA). As used herein, an EDFA is any optical repeater device used to boost the intensity of optical signals, such as those signals being carried through a fiber optic communications system.

Figure 7:
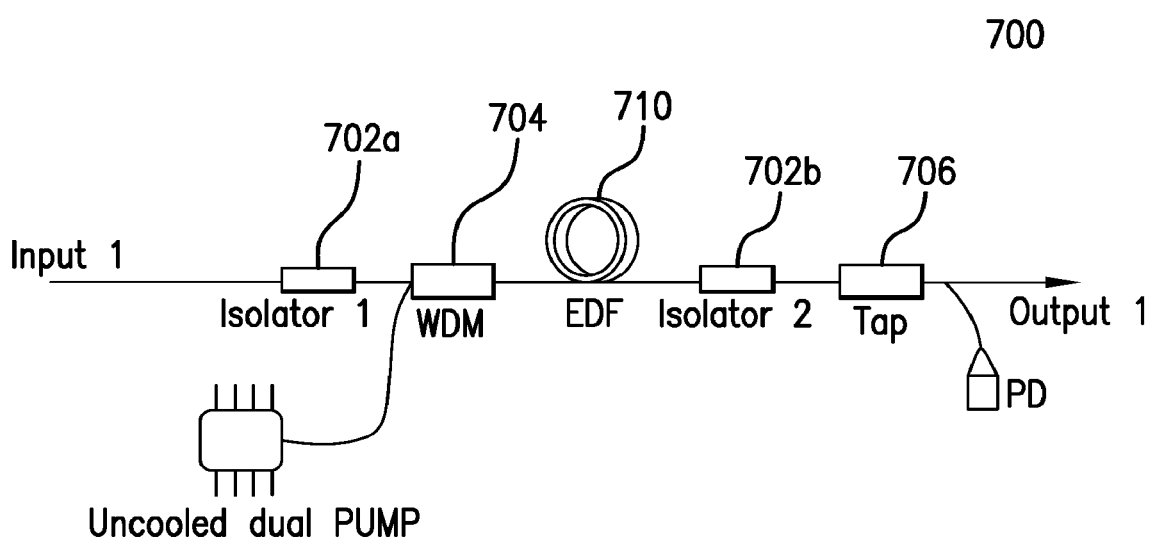
FIG. 7 illustrates aspects of the embodiments.

By way of example, FIG. 7 shows an EDFA 700 built comprised of micro optical components. The optical components include an isolator 702, a WDM 704, a tap photodiode (PD) 706, and a length, such as an approximately 2 m length, of fiber 710, such as Erbium doped fiber. Optical back reflection may be used to diagnose fiber connection issues in the illustrated EDFA, for example.

Figure 8:
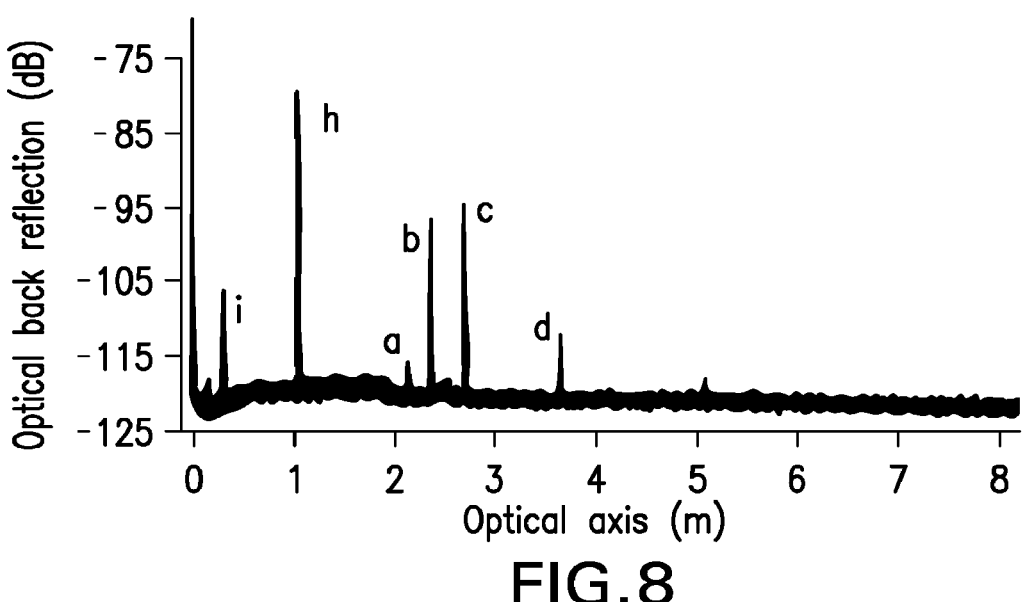
FIG. 8 illustrates aspects of the embodiments.

FIG. 8 shows the back reflection of the EDFA when the pump is off. The peak h is the reflectometer pigtail connector, peak a is the EDFA input back reflection, peak b is isolator 1 back reflection, peak c is WDM back reflection, and peak d is WDM pigtail. When the pump is off, the input light is absorbed and therefore no reflection from after the EDFA can be detected.

Figure 9:
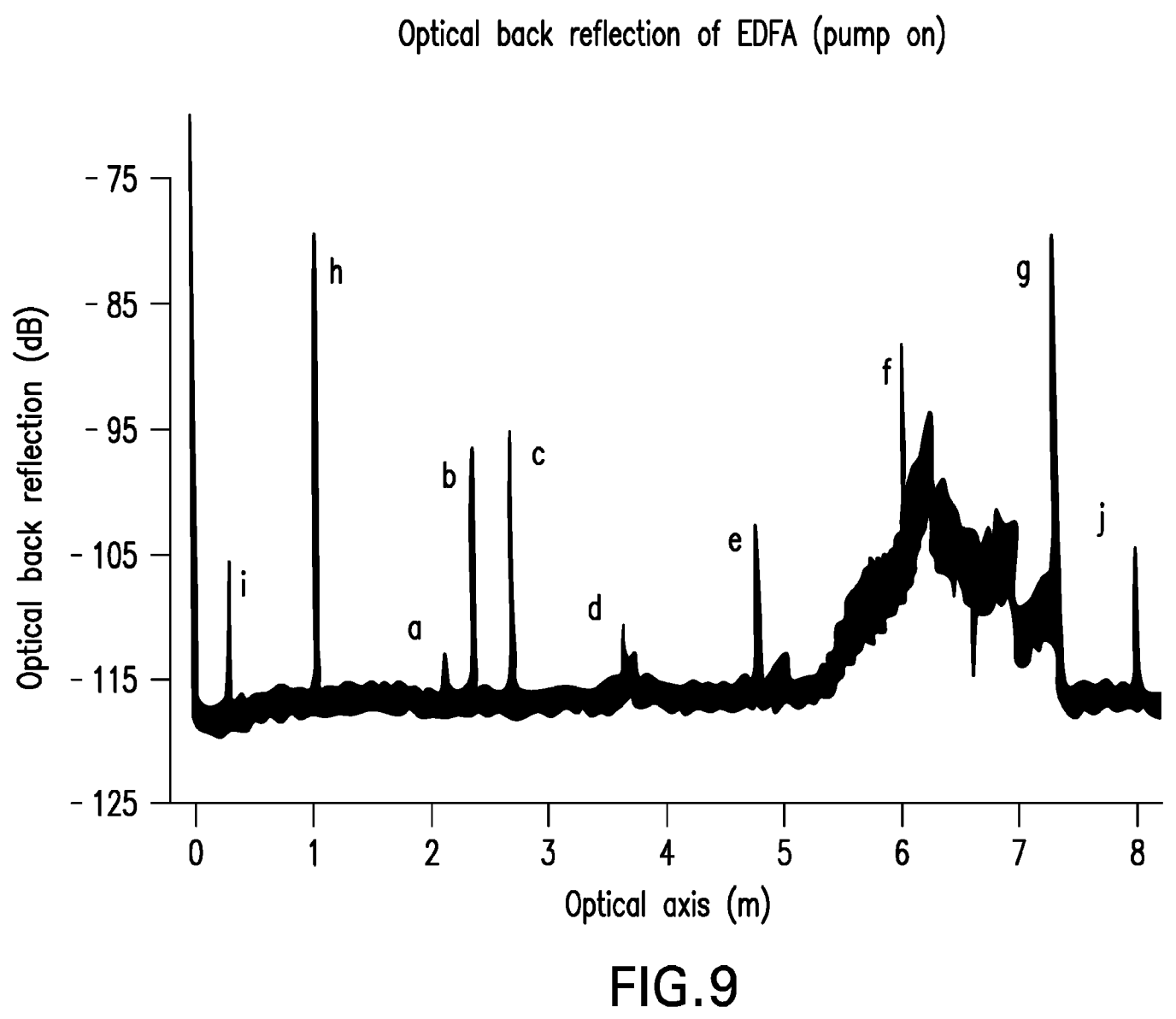

As the EDFA pump is turned on, more back reflections of EDFA can be detected. Peak e and f of FIG. 9 show two back reflections in the EDF, peak g shows reflection of isolator 2, and peak j shows the back reflection of tap PD.

From the back reflections of micro optical components, the mapping between the reflection peaks and micro component splicing points can be established. By way of non-limiting example, if there is a fiber broken in the middle, it will show as a strong peak. Moreover, the reflections after it will disappear, or attenuate by tens of dBs. Therefore, a method of diagnosing the micro optical components, at least in EDFAs, is provided. The resolution of the diagnostics is determined by reflectometer. By way of example, in FIG. 9, the resolution reaches 20 micrometers.

Accordingly, the embodiments allow for the use of optical back reflection to diagnose micro optical components, such as an EDFA. By way of example, the embodiments may be used to diagnose discontinuities in a signal path.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

In the foregoing Detailed Description, it can be seen that various features are grouped together in a single embodiment for the purpose of clarity and brevity of the disclosure. This method of disclosure is not to be interpreted as reflecting an intention that the embodiments require more features than are expressly recited herein. Rather, the disclosure is to encompass all variations and modifications to the disclosed embodiments that would be understood to the skilled artisan in light of the disclosure.

What is claimed is:

1. A micro-optical component system tester, comprising:
a light source; and
a coupler that passes aspects of light from the light source through an interface of an Erbium-doped fiber amplifier (EDFA) to a termination, and passes remaining aspects of the light from the light source back reflected from the interface of the EDFA to a power meter;
wherein the EDFA comprises a first isolator, a wavelength division multiplexer (WDM) operably coupled to an EDFA pump, at least one fiber, a second isolator, and a photodiode,
wherein the at least one fiber is disposed between the WDM and the second isolator, and
wherein a reading at the power meter of the back reflection corresponds to a diagnosis of fiber connection issues of the at least one fiber of the EDFA.

2. The tester of claim 1, wherein the coupler comprises a Y coupler.

3. The tester of claim 1, wherein the diagnosis comprises a system failure.

4. The tester of claim 1, wherein the diagnosis comprises a discontinuity.

5. The tester of claim 1, wherein a resolution of the diagnosis of the fiber connection issues reaches 20 micrometers.

6. The tester of claim 1, wherein the first isolator, WDM, fiber, the second isolator, and the photodiode are arranged in series.

7. The tester of claim 1, further comprising a comparative database associated with the power meter.

8. The tester of claim 7, wherein the comparative database is keyed to one of a plurality of available types of the EDFA.

9. The tester of claim 8, wherein, for each of the available types, the comparative database comprises a correspondence of a reading on the power meter to one of the diagnosis.

10. A micro-optical component system diagnostics apparatus, comprising:
an optical device that passes aspects of light from a light source through at least one interface of an Erbium-doped fiber amplifier (EDFA), and receives remaining aspects of the light from the light source upon back reflection from the at least one interface of the EDFA, wherein the EDFA comprises a first isolator, a wavelength division multiplexer (WDM) operably coupled to an EDFA pump, at least one fiber, a second isolator, and a photodiode, wherein the at least one fiber is disposed between the WDM and the second isolator; and
a comparative database associated with the optical device, wherein a reading at the optical device of the back reflection corresponds to a diagnostic of fiber connection issues of the fiber of the EDFA in the comparative database.

11. The apparatus of claim 10, wherein the diagnostic comprises a system failure.

12. The apparatus of claim 10, wherein the diagnostic comprises a discontinuity.

13. The apparatus of claim 10, wherein the comparative database is keyed to one of a plurality of available types of the EDFA.

14. The apparatus of claim 10, wherein the at least one interface comprises splicing points.

* * * * *